(12) United States Patent
Bate et al.

(10) Patent No.: US 8,507,602 B2
(45) Date of Patent: Aug. 13, 2013

(54) NON-STICK COATING COMPOSITION

(75) Inventors: Thomas J. Bate, Glenview, IL (US); Arthur Wachowski, Huntley, IL (US); Jan Wilhelm Ernst Moos, Orion Township, MI (US)

(73) Assignee: Whitford Worldwide Company, Elverson, PA (US)

(*) Notice: Subject to any disclaimer, the term of this patent is extended or adjusted under 35 U.S.C. 154(b) by 1183 days.

(21) Appl. No.: 12/092,211

(22) PCT Filed: Oct. 22, 2007

(86) PCT No.: PCT/US2007/082079
§ 371 (c)(1),
(2), (4) Date: Jun. 23, 2008

(87) PCT Pub. No.: WO2008/051901
PCT Pub. Date: May 2, 2008

(65) Prior Publication Data
US 2008/0269393 A1    Oct. 30, 2008

Related U.S. Application Data

(60) Provisional application No. 60/853,972, filed on Oct. 24, 2006.

(30) Foreign Application Priority Data
Nov. 8, 2006    (EP) .................................... 06123672

(51) Int. Cl.
*B05D 7/14*    (2006.01)
*B32B 15/08*    (2006.01)
*C08L 71/10*    (2006.01)
*C08G 65/40*    (2006.01)
*C08K 5/5419*    (2006.01)

(52) U.S. Cl.
USPC ........... 524/540; 524/268; 524/611; 524/876; 427/384; 427/386; 427/387; 427/388.1; 427/407.1; 427/409; 427/410; 428/450; 528/88; 525/393; 525/396; 525/534

(58) Field of Classification Search
USPC ................ 524/540, 268, 611, 876; 427/384, 427/386, 387, 388.1, 407.1, 409, 410; 428/450; 528/88; 525/393, 396, 534
See application file for complete search history.

(56) References Cited

U.S. PATENT DOCUMENTS

| | | | |
|---|---|---|---|
| 3,931,454 A * | 1/1976 | Sprengling | 174/254 |
| 4,355,122 A * | 10/1982 | Fan | 523/423 |
| 4,369,279 A | 1/1983 | Emerick | |
| 4,720,403 A * | 1/1988 | Jasenof et al. | 427/327 |
| 4,976,813 A * | 12/1990 | Salensky et al. | 156/230 |
| 5,266,611 A * | 11/1993 | Teschendorf | 523/416 |
| 5,756,638 A * | 5/1998 | von Gentzkow et al. | 528/108 |
| 5,925,499 A * | 7/1999 | Hernandez et al. | 430/280.1 |
| 6,034,160 A | 3/2000 | Eaton et al. | |
| 6,863,974 B2 | 3/2005 | Shah et al. | |
| 2003/0108746 A1* | 6/2003 | Choate et al. | 428/413 |
| 2004/0110011 A1 | 6/2004 | Shah et al. | |
| 2005/0054776 A1* | 3/2005 | Itou et al. | 525/191 |
| 2005/0124243 A1* | 6/2005 | Patel et al. | 442/93 |
| 2006/0147720 A1* | 7/2006 | Moore | 428/414 |
| 2010/0151253 A1* | 6/2010 | Roth et al. | 428/413 |

OTHER PUBLICATIONS

MSDS BYK 341, SSCP Co., Ltd. (No Date).*
International Preliminary Report on Patentability, PCT International Application No. PCT/US2007/082079, issued on Apr. 28, 2009.
International Search Report, PCT International Application No. PCT/US2007/082079, mailed Apr. 2, 2008.

* cited by examiner

*Primary Examiner* — Michael Pepitone
(74) *Attorney, Agent, or Firm* — Faegre Baker Daniels LLP

(57) ABSTRACT

A non-stick coating composition comprising a waterborne phenoxy resin, a crosslinker, and a silicone compound. The coating is substantially free of fluorocarbon resin. An article, such as aluminum, may be coated with the composition. The composition may be multi-layers, but only the layers other than the first layer includes the silicone compound. The invention includes the method for applying the coating or coatings.

36 Claims, No Drawings

NON-STICK COATING COMPOSITION

CROSS REFERENCE TO RELATED APPLICATIONS

This Application claims priority from Provisional Application No. 60/853,972, filed Oct. 24, 2006.

BACKGROUND OF THE INVENTION

1. Field of the Invention

The present invention relates to coating compositions having non-stick applications.

2. Prior Art

Non-stick coatings are well known in the art. In these coatings normally fluorocarbon resins are used, since these resins have a low surface energy as well as thermal and chemical resistance. However, non-stick coatings based upon fluorocarbon resins are limited with regard to abrasion resistance and resistance to flame contact, as well as adhesion to metal substrates. Such coatings are easily damaged when cut with a knit or another metal tool. Rubbing or sanding also easily wears these coatings away.

It is also known to crosslink water borne phenoxy resin with phenolics and melamine resins to form coatings for steel and aluminum.

Non-stick coatings may be applied in a single layer or as a multilayer coating.

Surprisingly it has been found that a superior non-stick coating can be obtained without the use of fluorocarbon resins, but with the incorporation of a silicone compound in a composition comprising a phenoxy resin and a crosslinker.

SUMMARY OF THE INVENTION

Accordingly, in one embodiment the present invention comprises a non-stick coating composition comprising a phenoxy resin, a crosslinker and a silicone compound. The composition is substantially free of fluorocarbon resin.

In another embodiment, the invention comprises a method of applying the above coating composition to a substrate, followed by drying and curing the coating composition.

In a further embodiment, the invention comprises applying a coating composition to a substrate comprising a waterborne phenoxy resin and crosslinker, and a silicone compound, comprising the sequential steps of:

A. Preparing the surface of the substrate for the coating;
B. Applying the coating as a one coat or multi coat non-stick coating, where the first coat comprises the phenoxy resin and crosslinker, and a silicone compound if the coating is applied as a one coat non-stick coating, and, if the coating is applied as a multi-coat non-slick coating, one or more of the coats other than the first coat comprises a silicone compound; and.
C. Baking the coated substrate to cure the coating. This typically occurs at temperatures ranging from about 200 to 350° C.

In all cases, every coat or coats are substantially free of fluorocarbon resin.

Other embodiments of the Invention comprise details concerning compositions, relative amounts of ingredients, particle sizes and method steps.

DETAILED DESCRIPTION OF THE INVENTION

One component of the composition of the present invention is a phenoxy resin. Phenoxy resin is a generic term used to describe the amorphous, high-molecular-weight poly(hydroxy ethers) derived from diphenols and epichlorohydrin. Poly(hydroxy ethers) are high strength, high-modulus materials which are thermally stable because they lack terminal epoxy groups, are easily fabricated, and have been used as molded objects, film, packaging material, coatings, and adhesives. Phenoxy resin emulsions or colloidal dispersions are particularly useful as an ingredient for the composition of the present invention. Combined with an appropriate crosslinker, the phenoxy resin will provide adhesion, and also a heat and abrasion resistant polymer matrix.

Other components of the present invention are;

Any crosslinker that enabless polymers to form with the phenoxy resin Is appropriate. Melamine (cyanurotriamide cyanuramide 2,4,6-tri-amino-8-triazine) is a preferred crosslinker.

Silicone is an elastomer in which the C linkages of a polymerized hydrocarbon are replaced by Si-0 linkages. Particularly preferred silicones for use with the composition of the present invention are silicone fluids and fluid emulsions, particularly silicone and water emulsions, as well as silicone resin emulsions, or combinations thereof.

It is preferred that epoxies be included in the composition of the invention. Phosphoric acid modified epoxy functional aqueous emulsions are most preferred.

According to one embodiment of the present invention, a substrate, such as aluminum or aluminum shaped articles, is coated with a non-stick coating comprising the composition of the present invention. Multi-coats may be applied, but, in case a one coat non-stick coating is applied, it is essential that that coat comprises the product of a mixture of waterborne phenoxy resin and crosslinker, and a silicone compound. When applied as a multi-coat system, it is essential that at least one coat other than the first coat (e.g. midcoat and topcoat) comprise a silicone component.

It is preferred that, when the coating is a single coat, that coat comprises the product of a mixture of waterborne phenoxy resin and crosslinker, an epoxy and a polyamideimide resin, and when the coating is multi-layer, coats other than the exterior coat comprise the product of a mixture of waterborne phenoxy resin and crosslinker, an epoxy and a polyamideimide resin.

A preferred first coat (primer) in a multi coat system may comprise the product of a mixture of waterborne phenoxy resin and crosslinker, but a silicone component is precluded.

Based on the amount of total solid resin, a preferred composition of the invention comprises 30-85 wt. % phenoxy resin, 0-15 wt. % epoxy, 8-25 wt. % crosslinker and 5-70 wt. % silicone.

The first coat (primer) and the second and/or third coat (midcoat and/or topcoat) may also comprise one or more of the following components: fillers, pigments surfactants, solvents, defoamers, and any other component for a coating composition known to the person skilled in the art; From about 10 wt. % to about 60 wt. % of inorganic inert particles and from about 10 wt. % to about 60 wt. % of other ingredients selected from the group consisting of fillers, pigments, surfactants, solvents, defoamers and mixtures thereof, the wt. °/0 being calculated on basis of the solid content of the primer composition.

The fillers in the first coat (primer) compositions may be selected from the group consisting of barium sulfate, calcium sulfate, calcium carbonate, silicas and silicates, silicon carbide and aluminum oxide.

The one coat or multi coat non-stick coating is substantially free of fluorocarbon resin. The term "substantially free" means less than about 5 wt. % of the total solids of any coat.

Less than about 1 wt. % of the total solids is preferred. It has been surprisingly found that the coating of the invention has superior non-stick surface properties as compared to conventional coatings that are not substantially free of fluorocarbon resin.

The first coat (primer) and other coats (midcoat and or topcoat) may include inorganic particles which are inert with respect to the other components that are present in the composition and can withstand a continuous service temperature in excess of 250° C. In addition, these particles are also stable at the eventual baking temperature of the non-stick coating. The particles are also not soluble in water or any other solvent that is present in the composition. The preferred amount of inorganic particles comprises 10-110 wt. % based on the total solid resin.

Examples of suitable inorganic particles include inorganic oxides, carbides or nitrides of elements in groups IIA-VB of the periodic table and natural minerals and mixtures thereof. Preferred inorganic particles include particles with an average particle size of at least 3 micrometers and more preferably in the range from about 5 to about 20 micrometers. The inorganic particles have a preferred Mohs hardness of at least about 5, more preferably a Mohs hardness of at least about 6. Examples of inorganic particles with Mohs hardness above 5 include alumina, zirconia, silicon carbide, titanium carbide, aluminum boride, and cristobalite.

In addition to the inorganic inert particles mentioned above, the coating compositions used according to the present invention can also comprise fillers, additives, and pigments that are commonly used in the preparation of coating compositions. Fillers can be any fillers known to those skilled in the art, e.g., barium sulfate, calcium sulfate, calcium carbonate, silicas or silicates (such as talc, feldspar, and china clay). Additives such as stabilizers, antioxidants, leveling agents, ant settling agents, matting agents, rheology modifiers, surface-active agents, UV light absorbers, light stabilizers, amine synergists, waxes, or adhesion promoters can also be added.

The substrates coated according to the present invention can be aluminum shaped articles, such as pots, pans, lids, mixing spoons, and all other utensils usually employed for food preparation and cooking (baking pans, oven racks etc.) as well as aluminum sheet to be shaped into the aforesaid articles. In both cases, the aluminum support is simply degreased according to any known method, e.g., in an alkaline or acid environment, or with organic solvents. In this treatment, the aluminum support maintains the surface roughness of the aluminum sheet, i.e. below 1.2 micrometers. In addition to the degreasing it is possible to roughen the surface.

Other metals may be suitable substrates, such as grit blasted stainless steel.

EXAMPLES

The following applies to the examples given below:
Scotch Brite Abrasion Test
The Scotch Brite Abrasion' Test measures a coating's resistance to a constant scrubbing with an abrasive scouring pad. The vertical load on the scouring pad is set to 10 pounds (4.54 kg), and the scouring pad is changed every 10,000 strokes. The number of cycles that are required to scrape the coating down to bare metal is recorded in order to gauge the abrasion resistance of the non-stick system.

Egg Release Test
A pan coated with non-stick coating is heated to 150° C., after which an egg is fried. The level of release is rated as follows;
Egg Release Grading Scale (Cleaning with Dishwasher Detergent/Water)
1. Very poor: Egg sticks to wear track and difficult to clean
2. Very poor: Egg sticks to wear track but cleaning somewhat easier
3. Very poor: Egg sticks to 90% of wear track but cleaned fairly easy
4. Very poor: Egg sticks to 80% of wear track but cleaned fairly easy
5. Poor: Egg sticks to 70% of wear track but cleaned fairly easy
6. Fair: Egg sticks to 60% of wear track but cleaned fairly easy
7. Fair: Egg sticks to 20-40% of wear track but cleaned fairly easy
8. Good: Egg sticks to 10% of wear track but cleaned easily
9. Very good: Egg could be removed intact with some difficulty, easy cleaning
10. Excellent: Clean removal of egg intact, no residue left.
Hand Held Tiger Paw Test
The hand held "Tiger Paw" device is an industry-accepted standard, which was designed to test the resistance of a non-stick coating to long-term kitchen abuse. The Hand Held Tiger Paw consists of a weighted apparatus, which uses three "ball point" pens to scratch the coating film. The cookware which is being tested is filled with a thin layer of cooking oil, and heated to 400° Fahrenheit (205° Celsius.)

The Tiger Paw is rotated over the non-stick surface in a circular fashion 2000 times, changing direction every 100 rotations. The coating is then examined for any fraying, blistering, or penetration to bare metal.

The invention will be elucidated with reference to the following examples. These are intended to illustrate the invention but are not to be construed as limiting in any manner the scope thereof.

Control 1

A state of the art, PTFE (polytetrafluoroethylene) containing 2 coat non-stick coating was prepared as follows and as described in U.S. Pat. No. 6,863,974 B2: A primer comprised of 33.0 wt. % polyamideimide (Torlon A110 from Solvay), 38.0 wt. % SiC (#600W from Electro Abrasive Powders, average particle size of 11 microns) and no fluoropolymer component, and a topcoat comprised of 58.14 wt. % PTFE dispersion (Fluon GP1 from Asahi Glass) and 0.5 wt. % polyamideimide (Torion A110 from Solvay) was applied to a non-gritblasted hard anodized aluminum substrate In the form of a frying pan, such that a dry film thickness of 0.5 mil primer and 0.5 mil topcoat was obtained, following a final bake of 3-5 minutes at 427° C. (metal temperature). The resulting baked film was comprised of 33.0 wt. % PAI (polyamidimide) and 38.0 wt. % SIC in the primer and 90.3 wt. % PTFE and 1.3 wt. % PAI in the topcoat layer.

Example 1

In an embodiment of the invention, a two coat fluoropolymer-free non-stick coating was prepared as follows:
A primer according to the present invention was prepared as follows;
Intermediate A: 17.50 grams of DI water and 17.50 grams of DiMethylEthanolAmine were premixed and added under stirring to 720.70 grams of Inchemrez PKHW 34 (phenoxy resin commercially available from Inchem). To this mixture was added under stirring, a blend of 79.80 grams of epoxy emulsion 14-9051 (commercially available from Peninsula Polymers) and 39.90 grams DI water. The following raw materials were added to this mixture while stirring and until a homogeneous blend was obtained: 35.00 grams Propylene Glycol, 35.00 grams Dowanol PM (solvent, commercially available from Dow), 17.50 grams of Surfynol 440 (surfactant) and 17.50 grams of Surfynol 104 BC (both commercially available from Air Products) and 70.00 grams of Ajac Black 611 (carbon black commercially available from Solution Dispersions Inc.).

To this composition was added, while stirring, the following mixture: 70.00 grams Cymel 303 LE (melamine commercially available from Cytec), 35.00 grams Propylene glycol, 35.00 grams n-Butanol, 46.70 grams DI Water and 23.30 grams Triethylamine.

Intermediate B: Under a high speed mixer, the following raw materials were blended for 15 minutes: 551.52 grams of DI water, 31.91 grams of Furfuryl alcohol, 44.68 grams of N-Methyl-Pyrolidone, 114 grams of Troykyd D 999 (a defoamer commercially available from Troy Chemicals), 19.68 grams of AMP 95 (an amine commercially available from Angus Chemical company), 39.54 grams of Triton X-100 (a surfactant commercially available from Rohm and Haas), 87.11 grams of Torlon AI-10 (polyamidimide commercially available from Solvay), 66.59 grams of Ultramarine Blue pigment (commercially available from Whittaker Clarke and Daniels) and 7.54 grams Titanium Dioxide RCL 535 (commercially available from Millennium Chemicals). After high speed mixing, the resulting slurry was ground in a ball mill, equipped with ceramic balls, for a period of 24 hours, after which the paste was removed from the ball mill. 312.10 grams of DI water was used to wash the mill and was subsequently mixed with the obtained paste. The resulting paste had a fineness of grind of less than 5 µm and solid content of 17.5% by weight.

1162.81 grams of Intermediate B was added, while stirring, to 1260.40 grams of Intermediate A. While stirring, 210 grams Silicon Carbide SIC 600 and 210 grams Silicon Carbide SCD 320 (both commercially available from Electro Abrasives) were added. After a homogeneous blend was obtained, the 760.80 grams DI water was added.

The resulting primer composition had a solid content of 40% by weight and a viscosity of 30-40s EZ cup #2

A Fluorpolymer-free topcoat was prepared as follows; To 188.20 grams of Inchemrez PKHW 34 (phenoxy resin commercially available from Inchem), 47.60 grams of Silrez MP 42E (silicone resin commercially available from Wacker) was added while stirring. To this mixture was then added, while stirring, a premix of 3.30 grams DI water and 3.3 grams of DiMethylEthanolAmine. While stirring, 5.00 grams Propylene glycol, 1.70 grams Surfynol 104 BC (commercially available from Air Products), 5.00 grams Dowanol PM (solvent commercially available from Dow) and 1.70 grams Surfynol 440 (surfactant commercially available from Air Products) were added. To this mixture a mixture of the following components was added while stirring: 16.00 grams Cymel 303 LF (melamine commercially available from Cytec), 8.00 grams Propylene glycol, 8.00 grams n-Butanol, 10.70 grams DI water and 5.30 grams triethanolamine. To this mixture was added, while stirring, 30.00 grams of a 50 weight % solid aluminum oxide (SGD 1000 commercially available from Mineral & Pigment Solutions Inc.) slurry in water, 4.00 grams Ajac Black 611 (commercially available from Solution Dispersions Inc.) and 1.70 grams of KW153 flash pearl (commercially available from Wenzhou Kunwel Pearl Pigment co.). Finally, 2.00 grams of Acrysol RM 825 (a rheological agent commercially available from Rohm and Haas) was added while stirring.

The primer was spray applied by HVLP (high volume, low pressure) application with a suction feed Binks Machi Gun (4-10 PSI pressure at tip, 0.9 mm nozzle) to an aluminum substrate having a typical Ra of 0.77-1.00 µm, to a dry film thickness of 15 to 18 microns, and subsequently dried at 100° C. for 3-5 minutes.

The topcoat was spray applied in a similar way on top of the dried primer, to a dry film thickness of 12 to 15 microns, and subsequently dried for 3-5 minutes at 100° C.

The resulting two layer coating was subsequently cured for 5 to 7 minutes at 288° C. Peak Metal Temperature.

The coated pans were then subjected to the Scotch Brite abrasion, egg release and Tiger Paw tests.

| Test Results Scotch Brite abrasion test | | |
|---|---|---|
| Pan | # Cycles | Results |
| Control 1 | 150,000 | Substrate visible |
| Example 1 | >200,000 | Minimal coating degradation |

| Test result Egg Release | | |
|---|---|---|
| Pan | # of abrasion cycles | Result |
| Control 1 | 0 | 10 |
|  | 10,000 | 10 |
|  | 40,000 | 10 |
|  | 120,000 | 2 |
| Example 1 | 0 | 10 |
|  | 10,000 | 10 |
|  | 40,000 | 8 |
|  | 120,000 | 6 |

| Test result Tiger Paw | |
|---|---|
| Pan | Result |
| Control 1 | Clearly visible surface scratching of coating no substrate visible |
| Example | Minor surface scratching of coating no substrate visible |

These test results demonstrate that the fluoropolymer-free non-stick coating according to the present invention provides better damage and wear resistance than state of the art fluoropolymer containing non-stick coating, while maintaining acceptable release properties.

The invention claimed is:

1. A coated article comprising a metal substrate in the form of a metal shaped article or a metal sheet, said metal substrate coated with at least one layer of a coating composition comprising the product of a mixture of at least one waterborne phenoxy resin, at least one crosslinker, and at least one silicone compound, said coating composition being substantially free of fluorocarbon resin and including, on the basis of total solid resins, 30-85 wt. % phenoxy resin, 0-15 wt. % epoxy, 8-25 wt. % crosslinker and 5-70 wt. % silicone compound.

2. The coated article of claim 1, wherein said coating composition further comprises at least one filler selected from the group consisting of barium sulfate, calcium sulfate, calcium carbonate, silicas and silicates.

3. The coated article of claim 1, wherein at least one said crosslinker is melamine.

4. The coated article of claim 1, wherein at least one said epoxy is present.

5. The coated article of claim 4, wherein at least one said epoxy is a phosphoric acid modified epoxy functional aqueous emulsion.

6. The coated article of claim 1, wherein said coating composition further comprises at least one polyamideimide.

7. The coated article of claim 1, wherein said at least one layer of said coating composition is a continuous layer.

8. A method of coating a metal substrate comprising the steps of:
providing a metal substrate in the form of a metal shaped article or a metal sheet;
applying at least one layer of a coating composition to the metal substrate, the coating composition comprising at least one waterborne phenoxy resin, at least one crosslinker, and at least one silicone compound, the coating composition being substantially free of fluorocarbon resin and including, on the basis of total solid resins, 30-85 wt. % phenoxy resin, 0-15 wt. % epoxy, 8-25 wt. % crosslinker and 5-70 wt. % silicone compound; and
curing the coating composition.

9. The method of claim 8 wherein the substrate comprises an aluminum sheet or a shaped aluminum article.

10. The method of claim 8 wherein the substrate comprises a grit blasted stainless steel sheet or a shaped grit blasted stainless steel article.

11. The method of claim 8 wherein the phenoxy resin is applied as a dispersion of the resin in water with a surfactant.

12. The method of claim 8 wherein the phenoxy resin is applied as a polymer powder with an organic liquid.

13. The method of claim 8 wherein the crosslinker is melamine.

14. The method of claim 8, wherein at least one epoxy is present.

15. The method of claim 14, wherein the epoxy is a phosphoric acid modified epoxy functional aqueous emulsion.

16. The method of claim 8, wherein the coating composition further comprises at least one polyamideimide.

17. The method of claim 8, wherein said curing step is carried out a temperature between 200 and 350° C.

18. The method of claim 8, wherein said applying step comprises applying at least one continuous layer of the coating composition.

19. A coated article comprising a metal substrate coated with a coating system comprising:
a metal substrate in the form of a metal shaped article or a metal sheet;
a first coating composition applied as a first layer to said metal substrate, said first coating composition comprising the product of a mixture of at least one waterborne phenoxy resin and at least one crosslinker; and
a second coating composition applied as a second layer over said first coating composition, said second coating composition comprising the product of a mixture of at least one waterborne phenoxy resin, at least one crosslinker, and at least one silicone compound and being substantially free of fluorocarbon resin, said second coating composition including, on the basis of total solid resins, 30-85 wt. % phenoxy resin, 0-15 wt. % epoxy, 8-25 wt. % crosslinker and 5-70 wt. % silicone compound.

20. The coated article of claim 19, wherein said coating composition further comprises at least one filler selected from the group consisting of barium sulfate, calcium sulfate, calcium carbonate, silicas and silicates.

21. The coated article of claim 19, wherein at least one said crosslinker is melamine.

22. The coated article of claim 19, wherein at least one said epoxy is present.

23. The coated article of claim 19, wherein at least one said epoxy is a phosphoric acid modified epoxy functional aqueous emulsion.

24. The coated article of claim 19, wherein said coating further comprises at least one polyamideimide.

25. The coated article of claim 19, wherein said first and second layers of said coating composition are continuous layers.

26. A method of coating a metal substrate comprising the steps of:
providing a metal substrate in the form of a metal shaped article or a metal sheet;
applying at least one layer of a first coating composition to the metal substrate, the first coating composition comprising the product of a mixture of at least one waterborne phenoxy resin and at least one crosslinker;
optionally curing the first coating composition;
applying at least one layer of a second coating composition over the first coating composition, the second coating composition comprising the product of a mixture of at least one waterborne phenoxy resin, at least one crosslinker, and at least one silicone compound and being substantially free of fluorocarbon resin, the second coating composition including, on the basis of total solid resins, 30-85 wt. % phenoxy resin, 0-15 wt. % epoxy, 8-25 wt. % crosslinker and 5-70 wt. % silicone compound; and
curing the second coating composition.

27. The method of claim 26, wherein the substrate comprises an aluminum sheet or a shaped aluminum article.

28. The method of claim 26, wherein the substrate comprises a grit blasted stainless steel sheet or a shaped grit blasted stainless steel article.

29. The method of claim 26, wherein the phenoxy resin is applied as a dispersion of the resin in water with a surfactant.

30. The method of claim 26, wherein the phenoxy resin is applied as a polymer powder with an organic liquid.

31. The method of claim 26, wherein the crosslinker is melamine.

32. The method of claim 26, wherein at least one epoxy is present.

33. The method of claim 32, wherein the epoxy is a phosphoric acid modified epoxy functional aqueous emulsion.

34. The method of claim 26, wherein the coating further comprises at least one polyamideimide.

35. The method of claim 26, wherein said curing step is carried out a temperature between 200 and 350° C.

36. The method of claim 26, wherein said applying steps comprises applying at least one continuous layer of the first and second coating compositions.

* * * * *